United States Patent
Ozaki

(10) Patent No.: US 12,301,058 B2
(45) Date of Patent: May 13, 2025

(54) ROTOR HAVING END MAGNET FIXED BY FIXING MEMBER

(71) Applicant: DENSO CORPORATION, Kariya (JP)

(72) Inventor: Masanori Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 17/889,773

(22) Filed: Aug. 17, 2022

(65) Prior Publication Data

US 2022/0393528 A1    Dec. 8, 2022

Related U.S. Application Data

(63) Continuation of application No. PCT/JP2021/005603, filed on Feb. 16, 2021.

(30) Foreign Application Priority Data

Feb. 17, 2020  (JP) .................................. 2020-024207

(51) Int. Cl.
*H02K 1/27*         (2022.01)

(52) U.S. Cl.
CPC ...................................... *H02K 1/27* (2013.01)

(58) Field of Classification Search
CPC ........ H02K 1/27; H02K 1/276; H02K 1/2766; H02K 1/2773; H02K 11/21; H02K 11/215; H02K 21/14; H02K 21/145; H02K 21/16
See application file for complete search history.

(56) References Cited

U.S. PATENT DOCUMENTS

| | | | |
|---|---|---|---|
| 2007/0145838 A1* | 6/2007 | Uchitani | H02K 29/08 310/90 |
| 2013/0313932 A1 | 11/2013 | Shibata | |
| 2019/0068015 A1 | 2/2019 | Yabe et al. | |

FOREIGN PATENT DOCUMENTS

| | | | | |
|---|---|---|---|---|
| JP | 2012231578 A | * | 11/2012 | |
| JP | 2014-241705 A | | 12/2014 | |
| JP | 2019-41530 A | | 3/2019 | |
| KR | 2014078795 A | * | 6/2014 | H02K 11/21 |

OTHER PUBLICATIONS

Nonaka (JP 2012231578 A) English Translation (Year: 2012).*
Seo (KR 20140078795 A) English Translation (Year: 2014).*

* cited by examiner

*Primary Examiner* — Tulsidas C Patel
*Assistant Examiner* — Robert E Mates
(74) *Attorney, Agent, or Firm* — Oliff PLC

(57) ABSTRACT

A rotor includes a rotor core having magnet-receiving holes formed therein, permanent magnets embedded respectively in the magnet-receiving holes of the rotor core, and an annular end magnet. The rotor is configured to generate both magnet torque by the permanent magnets and reluctance torque by outer core portions located on a radially outer side of the permanent magnets in the rotor core. The end magnet is provided at a position facing axial end faces of the outer core portions. Magnetic poles of the end magnet are arranged so as to respectively repel the outer core portions.

10 Claims, 6 Drawing Sheets

ROTOR HAVING END MAGNET FIXED BY FIXING MEMBER

CROSS-REFERENCE TO RELATED APPLICATIONS

The present application is a continuation application of International Application No. PCT/JP2021/005603 filed on Feb. 16, 2021, which is based on and claims priority from Japanese Patent Application No. 2020-024207 filed on Feb. 17, 2020. The entire contents of these applications are incorporated by reference into the present application.

BACKGROUND

1. Technical Field

The present disclosure relates to interior permanent magnet rotors.

2. Description of Related Art

Conventionally, rotating electric machines have been known which employ interior permanent magnet rotors. The interior permanent magnet rotors include a rotor core having magnet-receiving holes formed therein and permanent magnets embedded respectively in the magnet-receiving holes of the rotor core. The interior permanent magnet rotors are configured to generate both magnet torque by the permanent magnets and reluctance torque by outer core portions located on the radially outer side of the permanent magnets in the rotor core.

SUMMARY

According to the present disclosure, a rotor is provided which includes a rotor core having magnet-receiving holes formed therein, a rotating shaft insertion-fitted in a central part of the rotor core, permanent magnets embedded respectively in the magnet-receiving holes of the rotor core, and an annular end magnet. The rotor is configured to generate both magnet torque by the permanent magnets and reluctance torque by outer core portions located on a radially outer side of the permanent magnets in the rotor core. The end magnet is provided at a position facing axial end faces of the outer core portions. Magnetic poles of the end magnet are arranged so as to respectively repel the outer core portions. The end magnet is fixed by a fixing member in the rotor. The fixing member has a disc portion, a boss portion axially extending from a radially inner edge of the disc portion and fixedly fitted on the rotating shaft, and a tubular portion axially extending from a radially outer edge of the disc portion. The end magnet is fixed to the fixing member so that (i) an outer circumferential surface of the end magnet abuts the tubular portion of the fixing member and (ii) an axial end face of the end magnet abuts the disc portion of the fixing member.

DESCRIPTION OF EMBODIMENTS

In an interior permanent magnet rotor known in the art (see, for example, Japanese Patent Application Publication No. JP 2019-041530 A), magnetic flux leakage may occur at axial end faces of the rotor core. Specifically, in the rotor core, each of the permanent magnets has different polarities on the radially inner and outer sides thereof; thereof, leakage magnetic flux may flow from or to axial end faces of the outer core portions of the rotor core across axial end faces of the permanent magnets. Consequently, the performance of the rotating electric machine would be lowered due to the leakage magnetic flux.

In contrast, in the above-described rotor according to the present disclosure, the end magnet is provided at a position facing the axial end faces of the outer core portions and has its magnetic poles arranged so as to respectively repel the outer core portions. Consequently, it becomes possible to reduce leakage magnetic flux which flows from or to the axial end faces of the outer core portions across axial end faces of the permanent magnets. In addition, with the fixing member, it becomes possible to reliably fix the end magnet in the rotor.

Hereinafter, an embodiment of a rotating electric machine will be described with reference to FIGS. 1 to 4.

Figure 1:
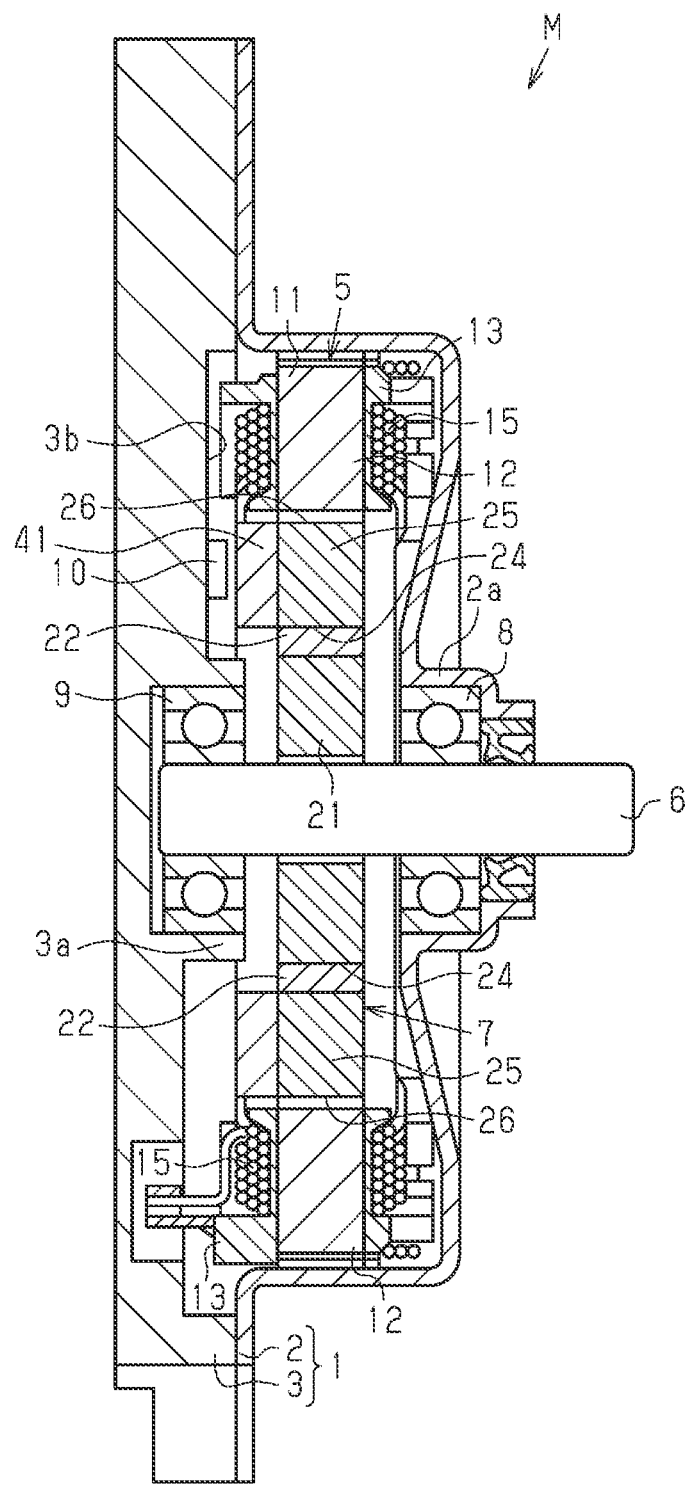
FIG. 1 is a cross-sectional view of a rotating electric machine according to an embodiment.

As shown in FIG. 1, the rotating electric machine M according to the present embodiment is an interior permanent magnet brushless motor designed to be used in a position control apparatus installed in an engine compartment of a vehicle, more particularly used in a valve timing control apparatus connected with an engine of the vehicle.

The rotating electric machine M includes a motor case 1. The motor case 1 has a tubular front housing 2 and an end frame 3. The front housing 2 is formed of a magnetic material in a bottomed tubular shape. The end frame 3 is formed of aluminum (i.e., non-magnetic material) and arranged to close an opening of the tubular front housing 2.

Moreover, the rotating electric machine M also includes a stator 5 fixed to an inner circumferential surface of the tubular front housing 2, and an interior permanent magnet rotor 7 arranged radially inside the stator 5 and including a rotating shaft 6. The rotating shaft 6 is supported by a pair of bearings 8 and 9 so as to be rotatable with respect to the motor case 1. The bearing 8 is received and fixed in a bearing holding portion 2a formed in the tubular front housing 2. On the other hand, the hearing 9 is received and fixed in a bearing holding portion 3a formed in the end frame 3. In addition, on an axially inner surface 3b of the end frame 3, there is fixed a magnetic sensor 10 such as a Hall-effect IC.

The rotating shaft 6 has a distal end portion protruding out of the tubular front housing 2. With rotary drive of the rotating shaft 6, the valve timing, i.e., the relative rotational phase of a camshaft to a crankshaft of the engine is suitably changed according to the operating sate of the engine.

The stator 5 is fixed to the inner circumferential surface of the tubular front housing 2. The stator 5 includes a cylindrical stator core 11, and an outer circumferential surface of the stator core 11 is fixed to the inner circumferential surface of the tubular front housing 2. On a radially inner side of the stator core 11, there are formed a plurality of teeth 12 along an axial direction of the stator core 11. The teeth 12 are arranged at equal pitches in a circumferential direction of the stator core 11 and each extend radially inward.

On the teeth 12, there are respectively wound windings 15 of three phases via insulators 13. Upon supply of a three-phase drive current to the windings 15, the stator 5 generates a rotating magnetic field, thereby causing the rotor 7 to rotate in forward and reverse directions.

The rotor 7 includes the rotating shaft 6, a substantially cylindrical rotor core 21 having the rotating shaft 6 insertion-fitted in a central part thereof, and a plurality (e.g., eight in the present embodiment) of permanent magnets 22 embedded in the rotor core 21.

Figure 2:
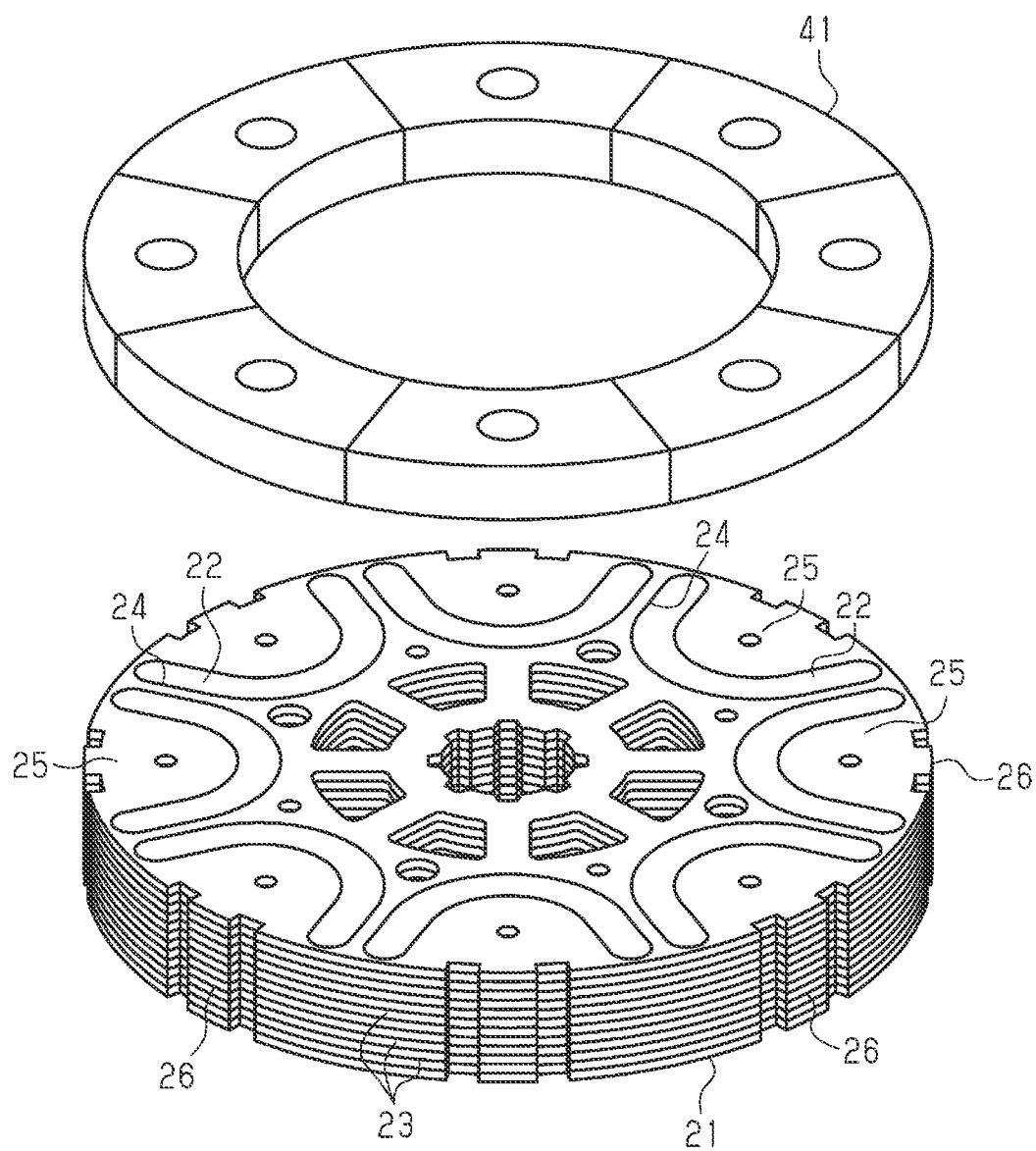
FIG. 2 is an exploded perspective view illustrating a rotor according to the embodiment.

As shown FIG. 2, the rotor core 21 is constituted of a plurality of magnetic steel sheets 23 that are formed of a magnetic metal material and laminated in an axial direction of the rotor core 21.

Figure 3:
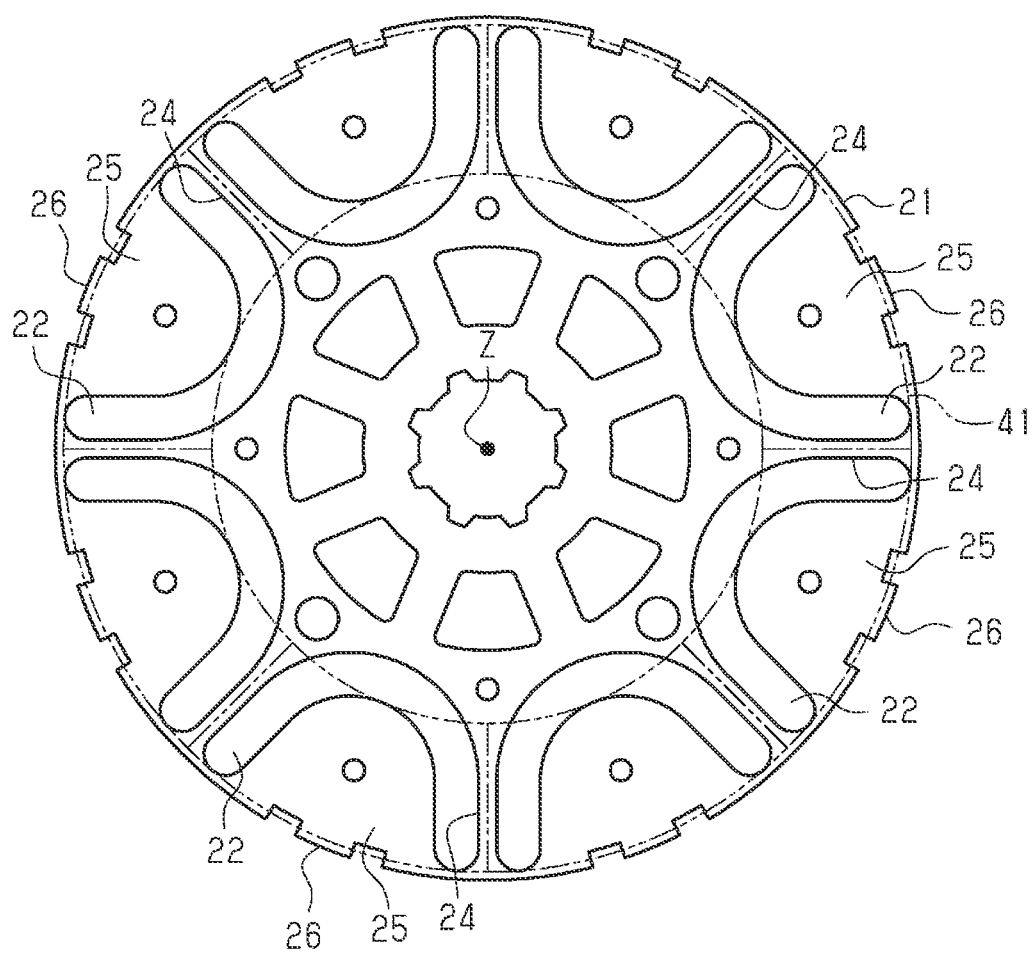
FIG. 3 is a plan view illustrating the rotor according to the embodiment.

As shown in FIGS. 1 to 3, the rotor core 21 has a plurality of magnet-receiving holes 24, in which the permanent magnets 22 are respectively received. The plurality (e.g., eight in the present embodiment) of magnet-receiving holes 24 are formed at equal intervals in a circumferential direction of the rotor core 21. Each of the magnet-receiving holes 24 has a continuous and folded substantially U-shape that is convex radially inward. In addition, all the magnet-receiving holes 24 are identical in shape to each other.

The permanent magnets 22 are implemented by bonded magnets that are formed by molding and solidifying a magnet material; the magnet material is a mixture of a magnet powder and a resin. More specifically, in the present embodiment, the magnet-receiving holes 24 of the rotor core 21 serve as forming molds. The permanent magnets 22 are formed by: filling the magnet material, which has not been solidified, into the magnet-receiving holes 24 of the rotor core 21 by injection molding without any gaps remaining therein; and then solidifying the magnet material in the magnet-receiving holes 24. Consequently, the external shape of the permanent magnets 22 conforms to the shape of the magnet-receiving holes 24 of the rotor core 21.

In the present embodiment, a samarium-iron-nitrogen-based (i.e., SmFeN-based) magnet powder is employed as the magnet powder for forming the permanent magnets 22. It should be noted that other rare-earth magnet powders may alternatively be employed as the magnet powder for forming the permanent magnets 22. Moreover, the permanent magnets 22 solidified in the magnet-receiving holes 24 of the rotor core 21 are magnetized by a not-shown magnetizing apparatus located outside the rotor core 21, so as to function as genuine magnets. More specifically, the permanent magnets 22 are magnetized so that the polarities of the permanent magnets 22 are alternately different in the circumferential direction of the rotor core 21. In addition, each of the permanent magnets 22 is magnetized in its thickness direction.

Those portions of the rotor core 21 which are located on the radially outer side of the permanent magnets 22 (i.e., those portions of the rotor core 21 which radially face the stator 5) function as outer core portions 25 to generate reluctance torque. In the present embodiment, the rotor 7 has eight rotor magnetic poles 26 each including a corresponding one of the eight permanent magnets 22 and a corresponding of the outer core portions 25 which is surrounded by the corresponding permanent magnet 22. Each of the rotor magnetic poles 26 functions as an N pole or an S pole. The rotor 7 is configured to generate both magnet torque and reluctance torque at the rotor magnetic poles 26 described above.

Next, the shape of the permanent magnets 22 will be described in detail. In addition, as described above, the shape of the permanent magnets 22 conforms to the shape of the magnet-receiving holes 24 of the rotor core 21.

Figure 4:
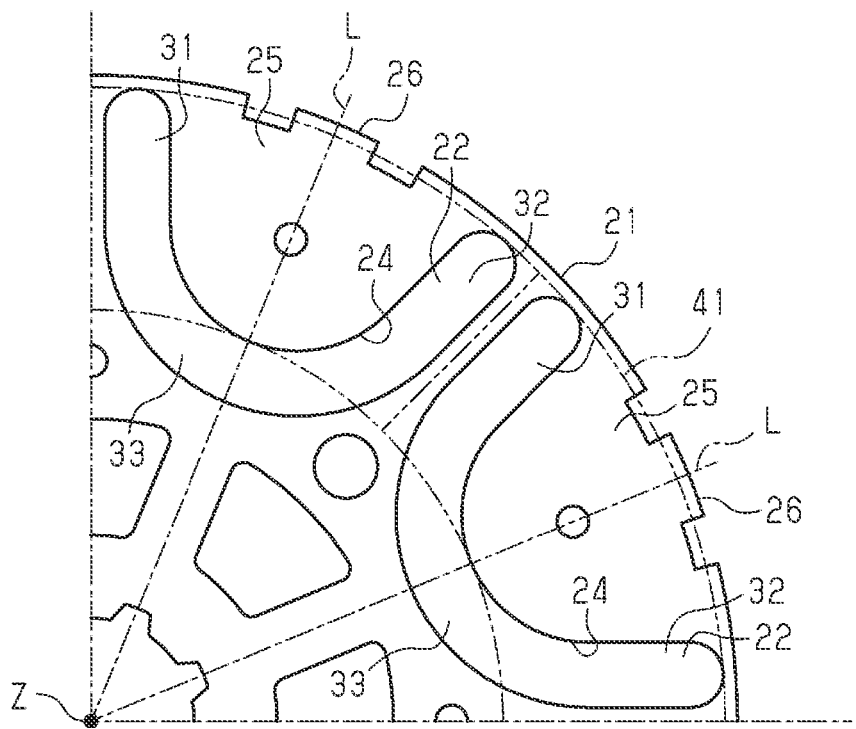
FIG. 4 is an enlarged plan view of part of the rotor according to the embodiment.

As shown in FIGS. 3 and 4, in an axial view of the rotor 7, each of the permanent magnets 22 has a continuous and folded substantially U-shape that is convex radially inward. Moreover, the shape of each of the permanent magnets 22 is symmetrical with respect to a circumferential centerline L passing through both an axis center Z of the rotor 7 and a circumferential center of the permanent magnet 22.

Each of the permanent magnets 22 has a first straight portion 31 on one circumferential side (e.g., the counterclockwise side), a second straight portion 32 on the other circumferential side (e.g., the clockwise side), and a bent portion 33 that is bent to connect radially inner ends of the first and second straight portions 31 and 32. Each of the first and second straight portions 31 and 32 extends along a radial direction of the rotor 7. More specifically, each of the first and second straight portions 31 and 32 extends parallel to a straight line passing through the axis center Z of the rotor 7. Moreover, for each circumferentially-adjacent pair of the permanent magnets 22, the adjacent first and second straight portions 31 and 32 of the pair of the permanent magnets 22 extend parallel to each other.

Moreover, in the present embodiment, the rotor 7 further includes an annular end magnet 41 that is located at a position facing axial end faces of the outer core portions 25 of the rotor core 21 and has magnetic poles arranged so as to respectively repel the outer core portions 25.

Specifically, the end magnet 41 is fixed by an adhesive to the axial end faces of the rotor core 21 and the permanent magnets 22 on one axial side thereof.

Moreover, an outer diameter of the end magnet 41 is set to be greater than or equal to an outermost diameter of the permanent magnets 22 and less than or equal to an outermost diameter of the rotor core 21. In other words, when viewed along the axial direction, a radially outer periphery of the end magnet 41 is located between a radially outermost position of the permanent magnets 22 and a radially outermost position of the rotor core 21. Furthermore, an inner diameter of the end magnet 41 is set to be equal to an innermost diameter of the outer core portions 25 of the rotor core 21. In other words, when viewed along the axial direction, a radially inner periphery of the end magnet 41 is located at a radially innermost position of the outer core portions 25 of the rotor core 21.

The end magnet 41 is magnetized in the axial direction. Moreover, the polarities of the magnetic poles of the end magnet 41 are alternately different in the circumferential direction. More particularly, in the present embodiment, the end magnet 41 is magnetized to have eight magnetic poles whose polarities are alternately different in the circumferential direction. That is, the number of the magnetic poles of the end magnet 41 is equal to the number of the permanent magnets 22 as well as to the number of the outer core portions 25 of the rotor core 21. The end magnet 41 is arranged so that each of the magnetic poles of the end magnet 41 repels a corresponding one of the outer core portions 25 of the rotor core 21, in other words, each of the magnetic poles of the end magnet 41 has the same polarity as the corresponding outer core portion 25 which faces the magnetic pole.

Furthermore, as shown in FIG. 1, the end magnet 41 is arranged to axially face the magnetic sensor 10 through a gap formed therebetween. The end magnet 41 constitutes a sensor magnet that enables the magnetic sensor 10 to detect a rotation angle of the rotor 7. In other words, the end magnet 41 also serves as a sensor magnet.

Next, explanation will be given of operation of the rotating electric machine M configured as described above.

For example, at a timing based on the rotation angle of the rotor 7 detected by the magnetic sensor 10, a three-phase drive current is supplied to the windings 15 of the stator 5 from an external electric power supply. Upon supply of the three-phase drive current to the windings 15, the stator 5 generates a rotating magnetic field, thereby driving the rotor 7 to rotate. Consequently, with rotation of the rotor 7, the valve timing, i.e., the relative rotational phase of the camshaft to the crankshaft of the engine is changed according to the operating sate of the engine.

According to the present embodiment, it is possible to achieve the following advantageous effects.

(1) The rotor 7 includes the end magnet 41. The magnetic poles of the end magnet 41 are arranged respectively at positions facing the axial end faces of the outer core portions 25 that are located on the radially outer side of the permanent magnets 22, so as to respectively repel the outer core portions 25. Consequently, it becomes possible to reduce leakage magnetic flux which flows from or to the axial end faces of the outer core portions 25 across axial end faces of the permanent magnets 22.

(2) The end magnet 41 constitutes a sensor magnet. Consequently, it becomes possible to suppress increase in the parts count of the rotor 7 in comparison with a configuration where a sensor magnet is originally included.

(3) The outer diameter of the end magnet 41 is set to be greater than or equal to the outermost diameter of the permanent magnets 22 and less than or equal to the outermost diameter of the rotor core 21. Consequently, it becomes possible to effectively reduce leakage magnetic flux on the radially outer peripheral side where the amount of leakage magnetic flux tends to become large, while preventing the end magnet 41 from making contact with the stator 5 that is arranged on the radial outer side of the rotor 7.

(4) The inner diameter of the end magnet 41 is set to be equal to the innermost diameter of the outer core portions 25. Consequently, it becomes possible to effectively reduce leakage magnetic flux on the radially inner peripheral side of the outer core portions 25.

The above-described embodiment can be modified and implemented as follows. Moreover, the above-described embodiment and the following modifications can also be implemented in combination with each other to the extent that there is no technical contradiction between them.

In the above-described embodiment, the inner diameter of the end magnet 41 is set to be equal to the innermost diameter of the outer core portions 25. However, the inner diameter of the end magnet 41 is not limited to this value and may alternatively be set to other values.

Figure 5:
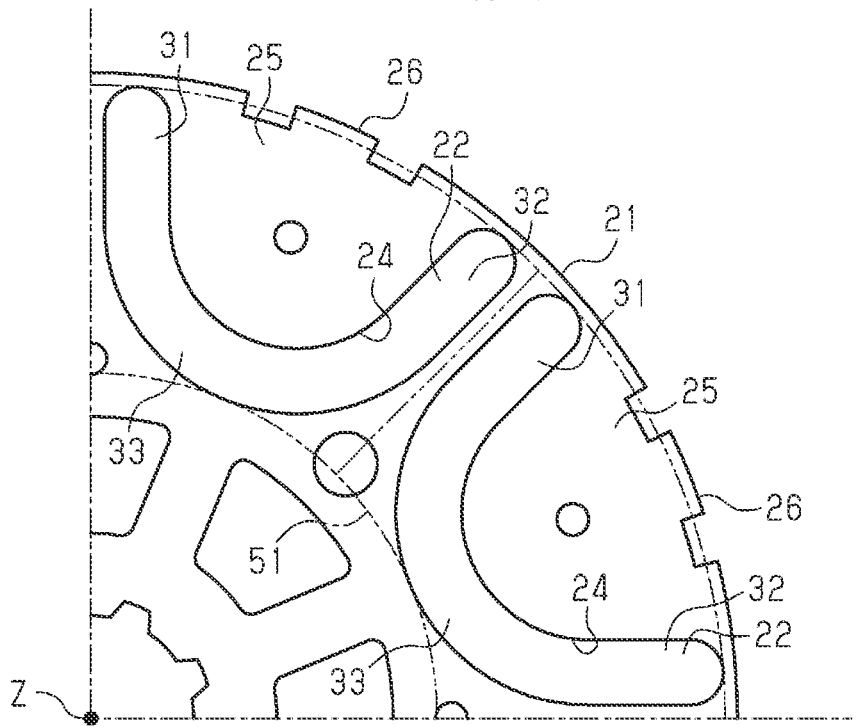
FIG. 5 is an enlarged plan view of part of a rotor according to a modification.

For example, as shown in FIG. 5, the inner diameter of an end magnet 51 may be set to be equal to an innermost diameter of the permanent magnets 22. In other words, the radially inner periphery of the end magnet 51 may be located at a radially innermost position of the permanent magnets 22 when viewed along the axial direction. In this case, it would be possible to further reduce leakage magnetic flux on the radially inner peripheral side of the outer core portions 25.

Figure 6:
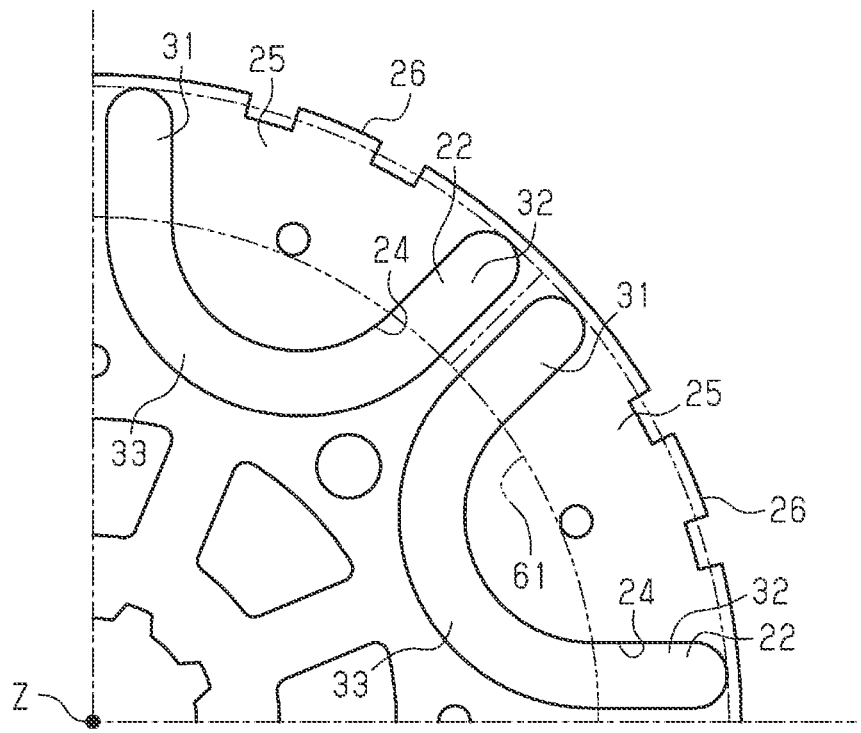
FIG. 6 is an enlarged plan view of part of a rotor according to another modification.

Otherwise, as shown in FIG. 6, the inner diameter of an end magnet 61 may be set to be equal to an innermost diameter of the first and second straight portions 31 and 32 of the permanent magnets 22. In other words, the radially inner periphery of the end magnet 61 may be located at a radially innermost position of the first and second straight portions 31 and 32 of the permanent magnets 22 when viewed along the axial direction.

In the above case, it would be possible to effectively reduce leakage magnetic flux between each circumferentially-adjacent pair of the outer core portions 25. More specifically, each of the first and second straight portions 31 and 32 of the permanent magnets 22 extends along a radial direction of the rotor 7; thus each circumferentially-adjacent pair of the first and second straight portions 31 and 32 of the permanent magnets 22 extend parallel to each other. Therefore, in each circumferentially-adjacent pair of the outer core portions 25, those parts of the pair of the outer core portions 25 which respectively abut a circumferentially-adjacent pair of the first and second straight portions 31 and 32 of the permanent magnets 22 are apart from each other by a constant short distance; thus it is easy for magnetic flux leakage to occur between those parts of the pair of the outer core portions 25. In this regard, with the end magnet 61 arranged to face those parts of the outer core portions 25 which respectively abut the first and second straight portions 31 and 32 of the permanent magnets 22, it would be possible to effectively reduce leakage magnetic flux between each circumferentially-adjacent pair of the outer core portions 25.

In the above-described embodiment, the outer diameter of the end magnet 41 is set to be greater than or equal to the outermost diameter of the permanent magnets 22 and less than or equal to the outermost diameter of the rotor core 21. However, the outer diameter of the end magnet 41 is not limited to this range and may alternatively be set to other values.

In the above-described embodiment, the end magnet 41 is fixed to the axial end faces of the rotor core 21 and the permanent magnets 22 by an adhesive. However, the fixing of the end magnet 41 is not limited to this method; the end magnet 41 may alternatively be fixed by other methods or configurations.

Figure 7:
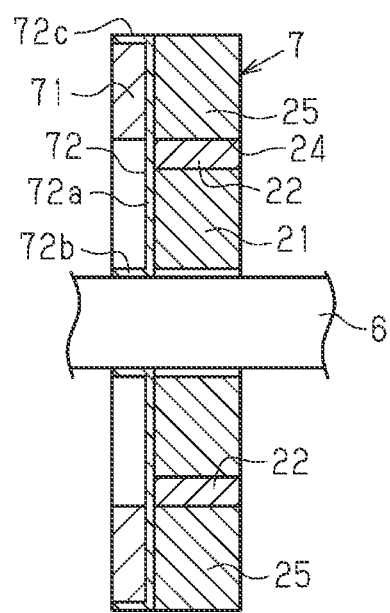
FIG. 7 is a partial cross-sectional view of a rotor according to yet another modification.

For example, as shown in FIG. 7, an end magnet 71 may be fixed by a fixing member 72. Specifically, the fixing member 72 has a disc portion 72a, a boss portion 72b axially extending from a radially inner edge of the disc portion 72a and fixedly fitted on the rotating shaft 6, and a tubular portion 72c axially extending from a radially outer edge of the disc portion 72a. The end magnet 71 may be fixed to the fixing member 72 so that: an outer circumferential surface of the end magnet 71 abuts the tubular portion 72c of the fixing member 72; and an axial end face of the end magnet 71 abuts the disc portion 72a of the fixing member 72.

Figure 8:
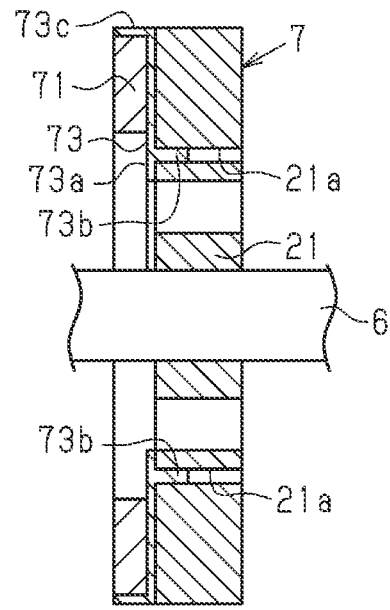
FIG. 8 is a partial cross-sectional view of a rotor according to still another modification.

Otherwise, as shown in FIG. 8, the end magnet 71 may be fixed by a fixing member 73. Specifically, the fixing member 73 has a disc portion 73a, pin portions 73b each axially extending from a radially inner part of the disc portion 73a and respectively press-fitted in positioning holes 21a formed in the rotor core 21, and a tubular portion 73c axially extending from a radially outer edge of the disc portion 73a. The end magnet 71 may be fixed to the fixing member 73 so that: the outer circumferential surface of the end magnet 71 abuts the tubular portion 73c of the fixing member 73; and the axial end face of the end magnet 71 abuts the disc portion 73a of the fixing member 73.

Fixing the end magnet 71 by the above alternative methods, it would be possible to achieve the same advantageous effects as the above-described embodiment provided that the magnetic poles of the end magnet 71 are arranged so as to respectively repel the outer core portions 25.

In the above-described embodiment, the end magnet 41 is arranged on only one axial side of the rotor core 21. However, the arrangement of the end magnet 41 is not limited to this manner.

Figure 9:
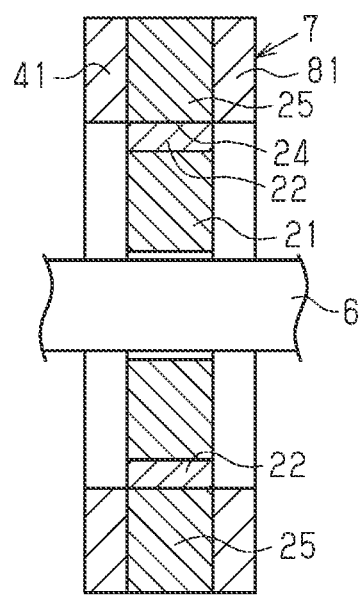
FIG. 9 is a partial cross-sectional view of a rotor according to another modification.

For example, as shown in FIG. 9, the end magnet 41 and an end magnet 81 may be arranged respectively on opposite axial sides of the rotor core 21. With the above arrangement, it would be possible to reduce leakage magnetic flux at both axial ends of the rotor 7. In addition, in this modification, only the end magnet 41 on one axial side of the rotor core 21 constitutes the sensor magnet, whereas the end magnet 81 on the other axial side of the rotor core 21 is provided only for reducing leakage magnetic flux.

In the above-described embodiment, the end magnet 41 constitutes the sensor magnet. However, the end magnet 41 may not constitute the sensor magnet. For example, the end magnet 41 may be provided only for reducing leakage magnetic flux; and the rotor 7 may further include a sensor magnet separate from the end magnet 41.

In the above-described embodiment, both the number of the permanent magnets 22 and the number of the magnetic poles of the end magnet 41 are set to eight. However, the number of the permanent magnets 22 and the number of the magnetic poles of the end magnet 41 may be changed provided that both the numbers are equal to each other.

In the above-described embodiment, each of the permanent magnets 22 is configured to have the first straight portion 31, the second straight portion 32 and the bent portion 33. Alternatively, each of the permanent magnets 22 may be configured such that the entire permanent magnet 22 is curved in an axial view.

In the above-described embodiment, the permanent magnets 22 are implemented by the bonded magnets. Alternatively, the permanent magnets 22 may be implemented by, for example, sintered magnets that are first sintered and then inserted respectively into the magnet-receiving holes 24 of the rotor core 21.

In the above-described embodiment, the rotor core 21 is formed by laminating the magnetic steel sheets 23 in the axial direction. Alternatively, the rotor core 21 may be formed by, for example, sintering a magnetic powder.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A rotor comprising:
a rotor core having magnet-receiving holes formed therein;
a rotating shaft insertion-fitted in a central part of the rotor core;
permanent magnets embedded respectively in the magnet-receiving holes of the rotor core; and
an end magnet having a continuous annular shape, wherein
the rotor is configured to generate both magnet torque by the permanent magnets and reluctance torque by outer core portions located on a radially outer side of the permanent magnets in the rotor core,
the end magnet is provided at a position facing axial end faces of the outer core portions,
magnetic poles of the end magnet are arranged so as to respectively repel the outer core portions,
the end magnet is fixed by a fixing member in the rotor,
the fixing member has a disc portion, a boss portion axially extending from a radially inner edge of the disc portion and fixedly fitted on the rotating shaft, and a tubular portion axially extending from a radially outer edge of the disc portion,
the end magnet is fixed to the fixing member so that (i) an outer circumferential surface of the end magnet abuts the tubular portion of the fixing member and (ii) an axial end face of the end magnet abuts the disc portion of the fixing member, and
an inner diameter of the end magnet is set to be equal to an innermost diameter of the outer core portions.

2. The rotor as set forth in claim 1, wherein
the end magnet constitutes a sensor magnet.

3. The rotor as set forth in claim 1, wherein
an outer diameter of the end magnet is set to be greater than or equal to an outermost diameter of the permanent magnets and less than or equal to an outermost diameter of the rotor core.

4. The rotor as set forth in claim 1, wherein
a pair of end magnets is provided respectively on opposite axial sides of the rotor core.

5. The rotor as set forth in claim 1, wherein
the end magnet is fixed to the fixing member with the disc portion of the fixing member interposed between the end magnet and the rotor core.

6. A rotor comprising:
a rotor core having magnet-receiving holes formed therein;
a rotating shaft insertion-fitted in a central part of the rotor core;
permanent magnets embedded respectively in the magnet-receiving holes of the rotor core; and
an end magnet having a continuous annular shape, wherein
the rotor is configured to generate both magnet torque by the permanent magnets and reluctance torque by outer core portions located on a radially outer side of the permanent magnets in the rotor core,
the end magnet is provided at a position facing axial end faces of the outer core portions,
magnetic poles of the end magnet are arranged so as to respectively repel the outer core portions,
the end magnet is fixed by a fixing member in the rotor,
the fixing member has a disc portion, a boss portion axially extending from a radially inner edge of the disc portion and fixedly fitted on the rotating shaft, and a tubular portion axially extending from a radially outer edge of the disc portion,
the end magnet is fixed to the fixing member so that (i) an outer circumferential surface of the end magnet abuts the tubular portion of the fixing member and (ii) an axial end face of the end magnet abuts the disc portion of the fixing member,
each of the permanent magnets has a folded shape that is convex radially inward in an axial view,
each of the permanent magnets has a pair of straight portions, which are formed respectively at opposite circumferential ends of the permanent magnet and each extend along a radial direction, and a bent portion formed at a circumferential center of the permanent magnet and connecting radially inner ends of the pair of straight portions, and an inner diameter of the end magnet is set to be equal to an innermost diameter of the straight portions of the permanent magnets.

7. The rotor as set forth in claim 6, wherein the end magnet constitutes a sensor magnet.

8. The rotor as set forth in claim 6, wherein an outer diameter of the end magnet is set to be greater than or equal to an outermost diameter of the permanent magnets and less than or equal to an outermost diameter of the rotor core.

9. The rotor as set forth in claim 6, wherein a pair of end magnets is provided respectively on opposite axial sides of the rotor core.

10. The rotor as set forth in claim 6, wherein the end magnet is fixed to the fixing member with the disc portion of the fixing member interposed between the end magnet and the rotor core.

* * * * *